United States Patent
Dougherty et al.

(10) Patent No.: US 9,426,441 B2
(45) Date of Patent: Aug. 23, 2016

(54) METHODS FOR CARRYING AND TRANSMITTING 3D Z-NORM ATTRIBUTES IN DIGITAL TV CLOSED CAPTIONING

(75) Inventors: James Dougherty, Morgan Hill, CA (US); Thomas Zato, Santa Clara, CA (US); Gianluca Filippini, Los Gatos, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 404 days.

(21) Appl. No.: 13/040,449

(22) Filed: Mar. 4, 2011
(Under 37 CFR 1.47)

(65) Prior Publication Data
US 2011/0216163 A1    Sep. 8, 2011

Related U.S. Application Data

(60) Provisional application No. 61/311,742, filed on Mar. 8, 2010.

(51) Int. Cl.
*H04N 13/00* (2006.01)

(52) U.S. Cl.
CPC .................................... *H04N 13/00* (2013.01)

(58) Field of Classification Search
CPC ...... H04N 13/0048; H04N 21/4884; H04N 13/007; H04N 13/0066; H04N 21/007; H04N 13/0022; H04N 13/00
USPC ........ 348/42–60, E13.033, E13.002
See application file for complete search history.

(56) References Cited

U.S. PATENT DOCUMENTS

| | | | |
|---|---|---|---|
| 4,859,994 A | 8/1989 | Zola et al. | |
| 5,615,046 A | 3/1997 | Gilchrist | |
| 6,285,779 B1 | 9/2001 | Lapidous et al. | |
| 6,631,205 B1 | 10/2003 | Melen et al. | |
| 6,707,950 B1 | 3/2004 | Burns et al. | |
| 6,791,540 B1 | 9/2004 | Baumberg | |
| 6,944,328 B2 | 9/2005 | Yoshida | |
| 7,015,920 B2 | 3/2006 | Ono | |
| 7,046,270 B2 | 5/2006 | Murata et al. | |
| 7,075,587 B2 | 7/2006 | Lee | |
| 7,177,357 B2 | 2/2007 | Yun et al. | |
| 7,274,816 B2 | 9/2007 | Yoshida | |
| 7,692,640 B2 | 4/2010 | Van Geest et al. | |
| 7,787,658 B2 | 8/2010 | Redert | |
| 8,166,042 B1 | 4/2012 | Praun et al. | |
| 8,290,244 B2* | 10/2012 | Ha ............................... | 382/154 |

(Continued)

FOREIGN PATENT DOCUMENTS

| | | |
|---|---|---|
| CN | 1947430 | 4/2007 |
| CN | 101180653 | 5/2008 |

(Continued)

OTHER PUBLICATIONS

Robert Kutka "Reconstruction of Correct 3-D Perception on Screens Viewed at Different Distances", IEEE vol. 42 No. 1 Jan. 1994.*

(Continued)

*Primary Examiner* — William C Vaughn, Jr.
*Assistant Examiner* — Naod Belai

(57) ABSTRACT

Methods for carrying and transmitting overlay depth data of an overlay of a stereoscopic image of a display device as a fraction of a viewer distance from the overlay are described.

20 Claims, 1 Drawing Sheet

(56) References Cited

U.S. PATENT DOCUMENTS

| | | | |
|---|---|---|---|
| 8,451,326 B2* | 5/2013 | Inaba | H04N 13/0059 348/58 |
| 9,215,435 B2 | 12/2015 | Tourapis et al. | |
| 2002/0015103 A1 | 2/2002 | Shi | |
| 2003/0043270 A1 | 3/2003 | Rafey et al. | |
| 2003/0103062 A1 | 6/2003 | Lee et al. | |
| 2004/0233275 A1 | 11/2004 | Tomita | |
| 2005/0053159 A1 | 3/2005 | Sugimoto | |
| 2005/0146521 A1 | 7/2005 | Kaye et al. | |
| 2005/0254702 A1 | 11/2005 | Era | |
| 2006/0088206 A1 | 4/2006 | Era | |
| 2006/0103664 A1 | 5/2006 | Nakanishi | |
| 2007/0008575 A1 | 1/2007 | Yu et al. | |
| 2007/0035618 A1 | 2/2007 | Yoshida | |
| 2007/0041444 A1 | 2/2007 | Gutierrez Novelo | |
| 2007/0047040 A1 | 3/2007 | Ha | |
| 2007/0146232 A1 | 6/2007 | Redert et al. | |
| 2007/0247522 A1 | 10/2007 | Holliman | |
| 2007/0257902 A1 | 11/2007 | Satoh et al. | |
| 2007/0288844 A1 | 12/2007 | Zingher et al. | |
| 2008/0018784 A1 | 1/2008 | Bennett | |
| 2008/0129864 A1* | 6/2008 | Stone et al. | 348/468 |
| 2008/0158345 A1 | 7/2008 | Schklair et al. | |
| 2008/0278487 A1 | 11/2008 | Gobert | |
| 2008/0303813 A1 | 12/2008 | Joung et al. | |
| 2009/0092335 A1 | 4/2009 | Kim et al. | |
| 2009/0142041 A1 | 6/2009 | Nagasawa et al. | |
| 2009/0259941 A1 | 10/2009 | Kennedy, Jr. | |
| 2009/0315979 A1 | 12/2009 | Jung et al. | |
| 2009/0315980 A1 | 12/2009 | Jung et al. | |
| 2010/0005491 A1* | 1/2010 | Corl | 725/44 |
| 2010/0021141 A1 | 1/2010 | Yamashita et al. | |
| 2010/0045779 A1 | 2/2010 | Kwon et al. | |
| 2010/0067873 A1 | 3/2010 | Sasaki et al. | |
| 2010/0086285 A1 | 4/2010 | Sasaki et al. | |
| 2010/0103168 A1 | 4/2010 | Jung et al. | |
| 2010/0142924 A1 | 6/2010 | Yamashita et al. | |
| 2010/0157025 A1* | 6/2010 | Suh et al. | 348/51 |
| 2010/0158099 A1 | 6/2010 | Kalva et al. | |
| 2010/0165081 A1 | 7/2010 | Jung et al. | |
| 2010/0195716 A1 | 8/2010 | Klein Gunnewiek et al. | |
| 2010/0208040 A1 | 8/2010 | Guillou | |
| 2010/0220175 A1 | 9/2010 | Claydon et al. | |
| 2010/0303444 A1 | 12/2010 | Sasaki et al. | |
| 2011/0032328 A1 | 2/2011 | Raveendran et al. | |
| 2011/0135005 A1 | 6/2011 | Tourapis et al. | |
| 2011/0142138 A1 | 6/2011 | Tian et al. | |
| 2011/0149036 A1* | 6/2011 | Suh et al. | 348/43 |
| 2011/0170792 A1 | 7/2011 | Tourapis et al. | |
| 2011/0242104 A1 | 10/2011 | Zhang et al. | |
| 2011/0292222 A1 | 12/2011 | Klein | |
| 2012/0056874 A1 | 3/2012 | Kim et al. | |
| 2012/0099836 A1 | 4/2012 | Welsh et al. | |
| 2012/0319945 A1 | 12/2012 | McCarthy et al. | |

FOREIGN PATENT DOCUMENTS

| | | |
|---|---|---|
| DE | 19545356 | 5/1996 |
| EP | 0777393 | 6/1997 |
| EP | 1089573 | 4/2001 |
| EP | 1744564 | 1/2007 |
| EP | 1912446 | 4/2008 |
| EP | 2202992 A2 | 6/2010 |
| GB | 2413910 | 11/2005 |
| JP | H09172654 | 6/1997 |
| JP | 2001218229 | 8/2001 |
| JP | 2003009185 | 1/2003 |
| JP | 2004220127 | 8/2004 |
| JP | 2004274125 | 9/2004 |
| JP | 2006325165 | 11/2006 |
| RU | 2237283 | 9/2004 |
| RU | 2340116 | 11/2008 |
| WO | 9837698 | 8/1998 |
| WO | 9930280 | 6/1999 |
| WO | 0180548 | 10/2001 |
| WO | 2004030375 | 4/2004 |
| WO | 2004059980 | 7/2004 |
| WO | 2006111893 | 10/2006 |
| WO | 2007064159 | 6/2007 |
| WO | 2007066868 | 6/2007 |
| WO | 2007092647 | 8/2007 |
| WO | 2008030011 | 3/2008 |
| WO | 2008038025 | 4/2008 |
| WO | 2008038205 | 4/2008 |
| WO | 2008044191 | 4/2008 |
| WO | 2008063170 | 5/2008 |
| WO | 2008115222 | 9/2008 |
| WO | 2008122838 | 10/2008 |
| WO | 2008139351 A1 | 11/2008 |
| WO | 2008150111 | 12/2008 |
| WO | 2008153313 A2 | 12/2008 |
| WO | 2009002115 A2 | 12/2008 |
| WO | 2009004742 | 1/2009 |
| WO | 2009027923 A1 | 3/2009 |
| WO | 2009034519 A1 | 3/2009 |
| WO | 2009157701 A2 | 12/2009 |
| WO | 2010/011557 | 1/2010 |
| WO | 2010010521 | 1/2010 |
| WO | 2010021666 A1 | 2/2010 |
| WO | 2010023592 A1 | 3/2010 |
| WO | 2010/039417 | 4/2010 |
| WO | 2010053246 A2 | 5/2010 |
| WO | 2010064118 | 6/2010 |
| WO | 2010070567 | 6/2010 |
| WO | 2010074437 A2 | 7/2010 |
| WO | 2010/151555 | 12/2010 |
| WO | 2010151555 | 12/2010 |
| WO | 2011/005544 | 1/2011 |
| WO | 2011/005544 A1 | 1/2011 |
| WO | 2011005025 | 1/2011 |
| WO | 2011006104 | 1/2011 |
| WO | 2011013030 A1 | 2/2011 |

OTHER PUBLICATIONS

Sokolova, et al., "Experiments in Stereo Vision" Computer Science 570, Final Project, Zitnick-Kanade Stereo Algorithm, last edited Dec. 12, 2006.

AviSynth, Main Page Mediawiki, starting from Aug. 5, 2007, the documentation on this site is released under the CreativeCommons Attribution—ShareAlike 3.0 License.

Eyeon Fusion video graphic into movie by Eyeon Software; copyright 1988-2010.

Hutchison, David, "Introducing DLP 3D TV" Texas Instruments, pp. 1-5.

McCormick, et al., "Implementation of Stereoscopic and Dual View Images on a MicroDisplay High Definition Television" May 28-30, 2008, 3DTV-Conference in Istanbul, Turkey, pp. 33-36.

Code for the Edge Detection and Image Segmentation System; new version with significant updates made available on Apr. 14, 2003 and small modification on the command line in the source file: May 5, 2009.

Adding Stereoscopic Subtitles to your Movies by the help of ffdshow.

Stereoscopic Subtitle Guide.

Koster, et al., "Use Two Video-Display Processors to Achieve 3-D, Overlay Effects" May 31, 1984, pp. 135-148 v. 29, n. 11 EDN.

CEA Standard Digital Television (DTV) Closed Captionining, CEA-708-D, Aug. 2008, published by Consumer Electronics Association.

Bruls, W. et al, "Enabling Introduction of Stereoscopic (3D) Video: Compression Standards & its Impact on Display Rendering," ICCE, 2007. 2 pages.

Chinese Office Action issued on Aug. 26, 2014 for Chinese Application 20108027974.9 filed on Jun. 22, 2010 in the name of Dolby Laboratories Licensing Corporation (English translation only) 11 pages.

Coll, B. et al, "3DTV at Home: Status, Challenges, and Solutions for Delivering a High Quality Experience," 2010. 6 pages.

Fehn, C. et al, "An Advanced 3DTV Concept Providing Interoperability and Scalability for a Wide Range of Multi-Baseline Geometries," IEEE, 2006. pp. 2961-2964.

(56) References Cited

OTHER PUBLICATIONS

Fehn, C., "Depth-Image-Based Rendering (DIBR), Compression, and Transmission for a New Approach on 3D-TV," SPIE 2004. 3 pages.
Grau, 0. et al, "Applications of Depth Metadata in a Production System," SMPTE Journal, 2002 Abstract Only.
Thomas, G. et al, "3D Image Acquisition for TV & Film Production," IEEE, 2002. 7 pages.
Wikipedia "OSI Model" https://en.wikipedia.org/wiki/OSI_model. Last Updated: Apr. 27, 2016 Downloaded from the internet: Apr. 28, 2016. 8 pages.
Non-Final Office Action for U.S. Appl. No. 13/380,020, filed Dec. 21, 2011 on behalf of Alexandros Tourapis. Mail Date: Jun. 2, 2015. 24 pages.
Notice of Allowance for U.S. Appl. No. 13/380,020, filed Dec. 21, 2011 on behalf of Alexandros Tourapis. Mail Date: Sep. 11, 2015. 7 pages.
Non-Final Office Action for U.S. Appl. No. 14/111,591, filed Oct. 14, 2013 on behalf of Richard J. Welsh. Mail Date: Sep. 24, 2015. 37 pages.
Final Office Action for U.S. Appl. No. 14/111,591, filed Oct. 14, 2013 on behalf of Richard J. Welsh. Mail Date: Feb. 23, 2016. 46 pages.
PCT International Search Report mailed on Jul. 9, 2012 for PCT Application PCT/US2012/032857 filed on Apr. 10, 2012 in the name of Dolby Laboratories Licensing Corporation.
PCT Written Opinion mailed on Jul. 9, 2012 for PCT Application PCT/US2012/032857 filed on Apr. 10, 2012 in the name of Dolby Laboratories Licensing Corporation.
PCT International Preliminary Report on Patentability completed Apr. 18, 2013 for PCT Application PCT/US2012/032857 filed on Apr. 10, 2012 in the name of Dolby Laboratories Licensing Corporation.
Corrected PCT International Preliminary Report on Patentability completed Oct. 8, 2013 for PCT Application PCT/US2012/032857 filed on Apr. 10, 2012 in the name of Dolby Laboratories Licensing Corporation.
U.S. Final Office Action issued on May 7, 2014 for U.S. Appl. No. 14/111,591, filed Oct. 14, 2013 in the name of Dolby Laboratories Licensing Corporation.
U.S. Non-Final Office Action issued on Jan. 23, 2015 for U.S. Appl. No. 14/111,591, filed Oct. 14, 2013 in the name of Dolby Laboratories Licensing Corporation.
U.S. Final Office Action issued on Apr. 3, 2015 for for U.S. Appl. No. 14/111,591, filed Oct. 14, 2013 in the name of Dolby Laboratories Licensing Corporation.
Non-Final Office Action for U.S. Appl. No. 13/380,160, filed Dec. 22, 2011 in the name of Richard J. Welsh. date issued: Jun. 10, 2014.
Examiner's Answer for U.S. Appl. No. 13/380,160, filed Dec. 22, 2011 in the name of Richard J. Welsh. date issued: Nov. 3, 2014.
Patent Board Decision on Appeal for U.S. Appl. No. 13/380,160, filed Dec. 22, 2011 in the name of Richard J. Welsh. date issued: May 1, 2015.
International Search Report mailed on Nov. 17, 2010 for PCT/US2010/039543 filed on Jun. 22, 2010 in the name of Dolby Laboratories Licensing Corporation.
Written Opinion mailed on Nov. 17, 2010 for PCT/US2010/039543 filed on Jun. 22, 2010 in the name of Dolby Laboratories Licensing Corporation.
International Preliminary Report on Patentability mailed on Oct. 12, 2011 for PCT/US2010/039543 filed on Jun. 22, 2010 in the name of Dolby Laboratories Licensing Corporation.
Yasuda, T. et al., "A Study of 3D Image Generating Method using Server Rendering" The Institute of Electronics, Information and Communication Engineers, 19th data Engineering Workshop Theses, Japan, The Institute of Electronics, Information and Communications Engineers, Special Committee for Data Engineering Research, Apr. 7, 2008. Abstract in English.
Translation of Office Action issued for related Russian patent application No. 2012101829/07 (002475) filed Jun. 22, 2010 in the name of Dolby Laboratories Licensing Corporation, mailed Jun. 2013.
Hutchison, D., "Introducing DLP 3-D TV, DLP" Texas Instruments, Jan. 2008, 1-5.
McCormick, et al., "Implementation of stereoscopic and dual view images on a micro-display high definition television" 3DTV-Con'08, May 28-30, 2008, 33-36.
"Gali-3D, Adding stereoscopic subtitles to your movies by the help of ffdshow!" retrieved on Mar. 31, 2011 from http://www.gali-3d.com/archive/articles/ffdshow-manual/ffdshow_stereo_subtitles.php.
Koster, et al., "Use two video-display processors to achieve 3-D, overlay effects" EDN May 31, 1984, 135-148.
"Stereoscopic subtitle guide" 3dTV virtual realities retrieved on Mar. 31, 2011 from http://www.3dtv.at/Knowhow/Subtitles_en.aspx.
PCT International Preliminary Report on Patentability mailed on Oct. 12, 2011 with Annex of International Application PCT/US2010/039547 filed on Jun. 22, 2010 in the name of Dolby Laboratories Licensing Corporation.
PCT International Search Report mailed on Sep. 3, 2010 for International Application PCT/US2010/039547 filed on Jun. 22, 2010 in the name of Dolby Laboratories Licensing Corporation.
PCT Informal Communication mailed on Sep. 20, 2011 for International Application PCT/US2010/039547 filed on Jun. 22, 2010 in the name of Dolby Laboratories Licensing Corporation.
Response to PCT Informal Communication for International Application PCT/US2010/039547 filed on Jun. 22, 2010 in the name of Dolby Laboratories Licensing Corporation.
PCT Written Opinion mailed on Sep. 3, 2010 of International Application PCT/US2010/039547 filed on Jun. 22, 2010 in the name of Dolby Laboratories Licensing Corporation.
Response to PCT Written Opinion for International Application PCT/US2010/039547 filed on Jun. 22, 2010 in the name of Dolby Laboratories Licensing Corporation.
PCT International Preliminary Report on Patentability mailed on Oct. 12, 2011 with Annex of International Application PCT/US2010/039543 filed on Jun. 22, 2010 in the name of Dolby Laboratories Licensing Corporation.
PCT International Search Report mailed on Nov. 17, 2010 for International Application PCT/US2010/039543 filed on Jun. 22, 2010 in the name of Dolby Laboratories Licensing Corporation.
Response to Informal Communication of International Application PCT/US2010/039543 filed on Jun. 22, 2010 in the name of Dolby Laboratories Licensing Corporation.
Non-final Office Action mailed on Mar. 19, 2013 for U.S. Appl. No. 13/380,160, filed Dec. 22, 2011 in the name of Dolby Laboratories, Inc.
Final Office Action mailed on Sep. 17, 2013 for U.S. Appl. No. 13/380,160, filed Dec. 22, 2011 in the name of Dolby Laboratories, Inc.
English translation of the First Office Action for Chinese Patent Application No. 201080027974.9 filed on Jun. 22, 2010 in the name of Dolby Laboratories Licensing Corporation, issued on Jan. 6, 2014.
English Translation of the Search Report for Chinese Patent Application No. 201080027974.9 filed on Jun. 22, 2010 in the name of Dolby Laboratories Licensing Corporation, issued on Jan. 6, 2014.

* cited by examiner

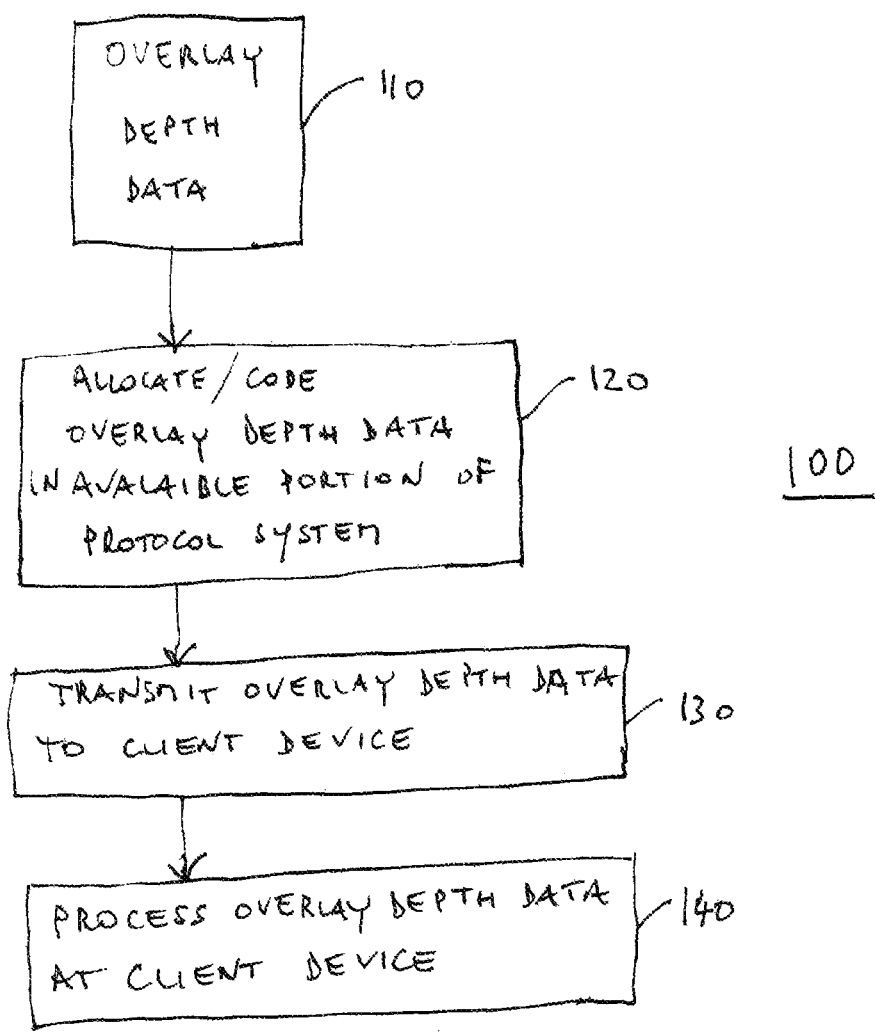

METHODS FOR CARRYING AND TRANSMITTING 3D Z-NORM ATTRIBUTES IN DIGITAL TV CLOSED CAPTIONING

CROSS REFERENCE TO RELATED APPLICATIONS

This application claims priority to U.S. Provisional Patent Application No. 61/311,742 filed Mar. 8, 2010, hereby incorporated by reference in its entirety.

The present application is related to PCT Application PCT/U.S. 2010/039543 for 'Perceptual Depth Placement For 3D Objects' by Richard Welsh and Christian Ralph, filed on Jun. 22, 2010 incorporated herein by reference in its entirety and attached herewith as Appendix A.

FIELD

The present disclosure relates to carriage of the z-norm depth information of the overlay. In particular, it relates to methods for carrying and transmitting 3D z-norm attributes in digital tv closed captioning.

BACKGROUND

The CEA-708-D standard (see, e.g., http://www.ce.org/Standards/browseByCommittee_2525.asp, incorporated herein by reference in its entirety) defines Digital TV closed captioning as used in Digital TV systems (ATSC, DVB, Cable), etc. Newer Digital TV systems provide a 3D rendering capability which provides for depth projection of Video content during playback through use of polarized glass and lens technology and/or shuttered glasses.

One problem present in such systems today is that there does not exist a means to specify, using existing CEA-708D captioning technology, the depth for which the on-screen display of caption data shall be rendered.

SUMMARY

According to a first aspect, a method for carrying data is provided, comprising: providing overlay depth data of an overlay of a stereoscopic image of a display device as a fraction of a viewer distance from the overlay; and allocating the overlay depth data in an available portion of a layer of a multilayer protocol system for transmission of overlays.

According to a second aspect, a method to transmit data to a client device is provided, comprising: providing overlay depth data of an overlay of a stereoscopic image of a display device as a fraction of a viewer distance from the overlay; coding the overlay depth data in an available portion of a layer of a multilayer protocol system for transmission of overlays; and transmitting the coded overlay depth data to the client device.

Therefore, in accordance with several embodiments of the present disclosure, means to extend the CEA-708-D closed caption standard are to support depth adjustment for the end user system.

APPENDIX

Appendix A is attached herewith and forms integral part of the specification of the present application.

BRIEF DESCRIPTION OF THE DRAWINGS

FIG. 1 shows a flowchart of an embodiment of the methods in accordance with the disclosure.

DESCRIPTION OF EXAMPLE EMBODIMENTS

Generation of normalized depth data on the z-axis is described in PCT Application PCT/U.S. 2010/039543 attached herewith as Appendix A. Such z-norm depth information can also apply to overlay and, in particular, to close captioning.

Embodiments of the present disclosure are directed to carriage of the z-norm depth information of the overlay. In particular, such information can be conveyed through unallocated elements of a closed captions standard, such as the CEA-708-D standard.

The closed captioning standard CEA-708-D defines a closed-caption system for digital television (DTV) using the OSI layered protocol model (see, e.g., http://en.wikipedia.org/wiki/OSI_model, incorporated herein by reference in its entirety). As such, the transport, packet, service, coding, and interpretation layer are all used by the standard. The structure of these layers is known to the person skilled in the art and will not be discussed in detail in the present application.

As shown in the examples below, the z-norm depth information can be coded in an available portion of a service layer, coding layer, packet layer etc. of the standard. On the client side, the client device (e.g., set-top box, television, personal computer and the like) can contain a software modification that permits dynamic 3D processing of the overlay.

The choice and selection of the layer (e.g., packet, service, coding) by which the depth information is communicated and the type of interpretation provided by the interpretation layer may be application specific.

Example 1

Packet Layer

For the packet layer definition, reference can be made to the cc_data( ) structure as defined in section 4.4 of CEA-708-D standard (DTV cc-data ( ) structure), incorporated herein by reference in its entirety. In accordance with the present disclosure, such a structure can be augmented such that one possible example of such an implementation would result in cc_data.reserved (8 bits) encodes the Z-Norm data as defined below:

reserved<7>=sign bit
reserved<6-0>=znorm value

The person skilled in the art will understand that other packet layer implementations are possible.

This packet layer embodiment allows for carriage of z-norm depth data on a per-packet basis. It should be noted that these bit definitions are currently reserved and set to all 1's. Therefore, such modification does not break existing compatibility with legacy systems.

Example 2

Service Layer

The DTV closed captioning standard CEA-708-D provides for up to 63 services. The services are time division multiplexed and inserted sequentially into caption channel packets (coding layer). Service #1 is the primary caption service while Service #2 provides for the secondary language service. Service #0 is not to be used. Service #1-6 are standard services and Services #7-#63 are extended services.

According to an embodiment of the present disclosure, a service # can be allocated from one of the extended services #7-#63.

For packing of z-norm data within a service channel, the service block definition of section 6.2 in CEA-708-D (6.2 Service Blocks, incorporated herein by reference in its entirety) can be used, with a service channel packet using an extended_service_number and block_size=1.

The format of the block_data[0] byte within the extended service packet can be similar to what shown in Example 1 above:

block_data[0].<7>=sign bit
block_data[0].reserved<6-0>=znorm value allowing for up to 64 signed and unsigned znorm correction values to be communicated to the DTV rendering device on a per-service basis. The person skilled in the art will understand that the above implementation could be done at different levels of the CC service protocol stack. The exemplary implementation above was chosen by applicants to support the broadcast compatibility across existing (Legacy) set-top box receivers and televisions.

Example 3

Coding Layer

For packing of Z-Norm data within the coding layer of CEA-708-D, any of the unused codes as defined in section 7 of CEA-708-D (7 DTVCC Coding Layer—Caption Data Services (Services 1-63), incorporated herein by reference in its entirety) can be used. One or more bytes of data can be supported using the 1, 2, or 3-byte character code extensions.

For optimal compatibility, the extended code space in section 7.1.1 (7.1.1 Extending The Code Space) can be used with a minimum of a 1-byte code from the C1 Code set defined in 7.1.5 (7.1.5 C1 Code Set—Captioning Command Control Codes). For example, a window command is a single byte that may be followed by several parameter bytes. In a similar fashion, a z-norm depth command may be defined as a one of the undefined window commands 0x93-0x96 which carries the z-norm bits as defined below:

znorm_direction<7>=sign bit
znorm_value<6-0>=znorm value

It should be noted however, that additional information may be conveyed beyond just the Z-Norm shift offset and sign (positive/negative direction). However, at the time of this writing the above requirements should meet the majority of existing TV platforms supporting stereoscopic display capabilities however, without loss of generality, additional fields may be encapsulated in this proposed schema.

The person skilled in the art will understand that, for all of the examples provided above, the bit definition may change to allow for less depth information to be carried since most current displays do not allow for more than 15 pixel offset correction to be performed. The present disclosure is intended to cover any and all definitions for these bits, with the main concepts of the disclosure allowing for any embodiment or derivative of the same to be covered across all layers of the transport medium.

Therefore, in accordance with several embodiments of the present disclosure, a method (100) as disclosed in the flowchart of FIG. 1. Overlay depth data are provided (110) and allocated and/or coded (120) in an available portion of a protocol system such as a protocol operating according to a CEA-708-D standard. The overlay depth data can then be transmitted (130) to a client device and processed (140) at such device.

In another embodiment, a normalized 1 meter screen width can be used, such as a 1000 pixel wide screen with 1 millimeter per pixel resolution. Normalization provides an advantage that the playback device need only know its own screen width ($w_s$) to appropriately render an object at depth, and composition software can virtually render (e.g., no physical screen used to make object depth decision) using the normalized screen width. That is to say, a $w_s$ value need not be communicated since it is known a priori.

Additionally, the numerical presentation of $z_{pv}$ cannot adequately express depth at or beyond the plane of infinity. This shortfall is traversed by appreciating that an object will appear to be at infinity when the visual axes of a viewer's eyes are parallel. Thus, the plane of infinity can be specified to be at or about the negative value of interocular separation (about −65 millimeters for an adult). For a normalized 1 pixel/millimeter screen, the plane of infinity can be established to have a pixel separation offset at or about −65 pixels.

Using 3D positioning layout for a normalized screen, either a playback or compositing device can appropriately insert an object, such as captioning, into a 3D image when provided with three positional values: x as a percent of screen width, y as a percent of screen height, and $z_n$ as a percent of perceived normalized depth. A normalized pixel separation offset, $S_p$, can then be computed at least as follows, without limitation:

$$S_p = z_n\left(\frac{65}{100 - z_n}\right);$$

where $0 \leq z_n \leq 100$ (i.e., object lying on or in front of screen plane towards viewer position; and
$S_p = 0.65 z_n$, where $z_n < 0$ (i.e., object lying behind the screen plane away from the viewer position).

The normalized pixel separation offset allows object placement in 3D space with respect to a viewer's perceived depth independently of display size or viewer distance. A playback device can use the normalized pixel separation offset ($S_p$) received, for example as metadata in a bitstream, to compute a device specific pixel separation offset ($S_{cf}$) by adjusting with a factor of its own pixel pitch. If the playback device's pixel pitch is 0.5 millimeters instead of 1 millimeter of the normalized screen, then $S_{cf}=S_p/0.5$, in this example.

The present disclosure may suitably comprise, consist of, or consist essentially of, any element (the various parts and/or features of the disclosure) and their equivalents as described herein. Further, embodiments of the present disclosure may be practiced in the absence of any element, whether or not specifically disclosed herein. Numerous modifications and variations of the disclosure are possible in light of the above teachings. It is therefore to be understood that within the scope of the appended claims, the disclosure may be practiced otherwise than as specifically described herein.

The invention claimed is:

1. A computer-implemented method for displaying a stereoscopic image on a playback display device, comprising executing on a processor the steps of:
    A) determining a normalized pixel separation offset based on an interocular separation at infinity for a screen resolution of a normalized display device and a percentage of viewer distance from a screen plane of the normalized display device of an object in the stereoscopic image;

B) generating overlay depth data of an overlay of the stereoscopic image for the playback display device, the overlay depth data comprising the normalized pixel separation offset;

C) allocating the overlay depth data in an available portion of a layer of a multilayer protocol system for transmission of overlays;

D) transmitting the overlay depth data to the playback display device;

E) converting, for the playback display device, the normalized pixel separation offset to a device specific pixel separation offset using the ratio of resolutions of the normalized display device and the playback display device; and F) displaying the stereoscopic image on the playback display device using the device specific pixel separation offset.

2. The method of claim 1, wherein the overlay depth data are close captioning depth data and the multilayer protocol system for transmission of overlays is a multilayer protocol system for transmission of close captioning.

3. The method of claim 2, wherein the multilayer protocol system for transmission of close captioning operates according to a CEA-708-D standard.

4. The method of claim 2, wherein the available portion is a portion of a packet layer of the multilayer protocol system.

5. The method of claim 4, wherein the multilayer protocol system for transmission of close captioning operates according to a CEA-708-D standard and wherein an augmented cc_data ( ) structure is provided to carry the overlay depth data.

6. The method of claim 5, wherein a first section of the augmented cc_data( ) structure carries a sign bit and a second section of the augmented cc_data( ) structure carries a binary value of the overlay depth data.

7. The method of claim 2, wherein the available portion is a portion of a service layer of the multilayer protocol system.

8. The method of claim 7, wherein the multilayer protocol system for transmission of close captioning operates according to a CEA-708-D standard and wherein extended services are adopted to carry the overlay depth data.

9. The method of claim 8, wherein the extended services are selected between service #7 and service #73.

10. The method of claim 8, wherein the extended services comprise a size portion and a data portion, and wherein a first section of the data portion carries a sign bit and a second section of the data portion carries a binary value of the overlay depth data.

11. The method of claim 2, wherein the available portion is a portion of a coding layer of the multilayer protocol system.

12. The method of claim 11, wherein the multilayer protocol system for transmission of close captioning operates according to a CEA-708-D standard and wherein the overlay depth data are supported through 1-byte, 2-byte or 3-byte character code extensions.

13. The method of claim 12, wherein the overlay depth data are supported through an undefined window command.

14. The method of claim 13, wherein the window command is selected between window commands 0x93 and 0x96.

15. The method of claim 14, wherein a first section of the window command carries a sign bit and a second section of the window command carries a binary value of the overlay depth data.

16. A computer-implemented method for displaying a stereoscopic image to a client device, the method comprising executing on a processor the steps of:

determining a normalized pixel separation offset based on an interocular separation at infinity for a screen resolution of a normalized display device and a percentage of viewer distance from a screen plane of the normalized display device of an object in the stereoscopic image:

generating overlay depth data of an overlay of the stereoscopic image of for the client device, the overlay depth data comprising the normalized pixel separation offset a normalized fraction of a viewer distance from a screen plane of the display device;

coding the overlay depth data in an available portion of a layer of a multilayer protocol system for transmission of overlays;

transmitting the coded overlay depth data to the client device;

converting, for the client device, the normalized pixel separation offset to a device specific pixel separation offset using the ratio of resolutions of the normalized display device and the display device; and displaying the stereoscopic image on the client device using the device specific pixel separation offset.

17. The method of claim 16, wherein the client device is selected from set-top box, television and personal computer.

18. The method of claim 16, wherein the client device processes the coded overlay depth data.

19. A method of rendering an overlay of a stereoscopic image by means of a client device, the method comprising:

transmitting overlay depth data to the client device according to the method of claim 16;

processing the overlay depth data received; and rendering the overlay of a stereoscopic image at a normalized fraction of a viewer distance from a screen plane of a display of the client device as a function of the overlay depth data.

20. The method of claim 19, wherein the overlay is a closed caption.

* * * * *